(12) United States Patent
Jayakrishnasamy et al.

(10) Patent No.: US 12,380,278 B2
(45) Date of Patent: Aug. 5, 2025

(54) SYSTEMS AND METHODS FOR SEMANTIC SEPARATION OF MULTIPLE INTENTIONS IN TEXT DATA USING REINFORCEMENT LEARNING

(71) Applicant: Verizon Patent and Licensing Inc., Basking Ridge, NJ (US)

(72) Inventors: Miruna Jayakrishnasamy, Vellore (IN); Prakash Ranganathan, Villupuram (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 393 days.

(21) Appl. No.: 18/055,211

(22) Filed: Nov. 14, 2022

(65) Prior Publication Data

US 2024/0160847 A1    May 16, 2024

(51) Int. Cl.
*G06F 40/30* (2020.01)
*G10L 15/19* (2013.01)
*G10L 15/193* (2013.01)
*G10L 15/197* (2013.01)

(52) U.S. Cl.
CPC .................... *G06F 40/30* (2020.01)

(58) Field of Classification Search
CPC ...................................................... G06F 40/30
See application file for complete search history.

(56) References Cited

U.S. PATENT DOCUMENTS

| | | | |
|---|---|---|---|
| 8,676,937 B2 * | 3/2014 | Rapaport | H04L 67/306 709/219 |
| 2012/0137367 A1 * | 5/2012 | Dupont | G06F 21/00 726/25 |
| 2018/0189691 A1 * | 7/2018 | Oehrle | G06N 7/01 |
| 2020/0175961 A1 * | 6/2020 | Thomson | G10L 15/28 |
| 2020/0243094 A1 * | 7/2020 | Thomson | G10L 15/28 |
| 2022/0164643 A1 * | 5/2022 | Charnock | G06N 3/04 |
| 2024/0160847 A1 * | 5/2024 | Jayakrishnasamy | G06F 40/30 |

\* cited by examiner

*Primary Examiner* — Michael N Opsasnick

(57) ABSTRACT

A device identifies, in multi-context text data, unrelated text and coreference text, and extracts coreference clusters, coreference sentences, and coreference sentiments based on the coreference text. The device extracts unrelated sentences from the unrelated text, and assigns tenses to the coreference sentences and the unrelated sentences. The device extracts phrases and entities from the coreference sentences and unrelated sentences, and assigns tense flags that exclude present tense sentences. The device selects past tense phrases and future tense phrases, and combines the past tense phrases and the future tense phrases to generate phrases. The device identifies invalid phrases in the phrases, and identifies similarities between the coreference sentences and the invalid phrases. The device processes the coreference text, the coreference tenses, the coreference sentiments, and the similarities, with a reinforcement learning model, to generate final context text.

20 Claims, 12 Drawing Sheets

SYSTEMS AND METHODS FOR SEMANTIC SEPARATION OF MULTIPLE INTENTIONS IN TEXT DATA USING REINFORCEMENT LEARNING

BACKGROUND

With the evolution of the Internet, more text data is generated by customers through websites, social networks, blogs, online portals, reviews, opinions, recommendations, ratings, feedback, and/or the like.

DETAILED DESCRIPTION OF EXAMPLE EMBODIMENTS

Figure 1A:
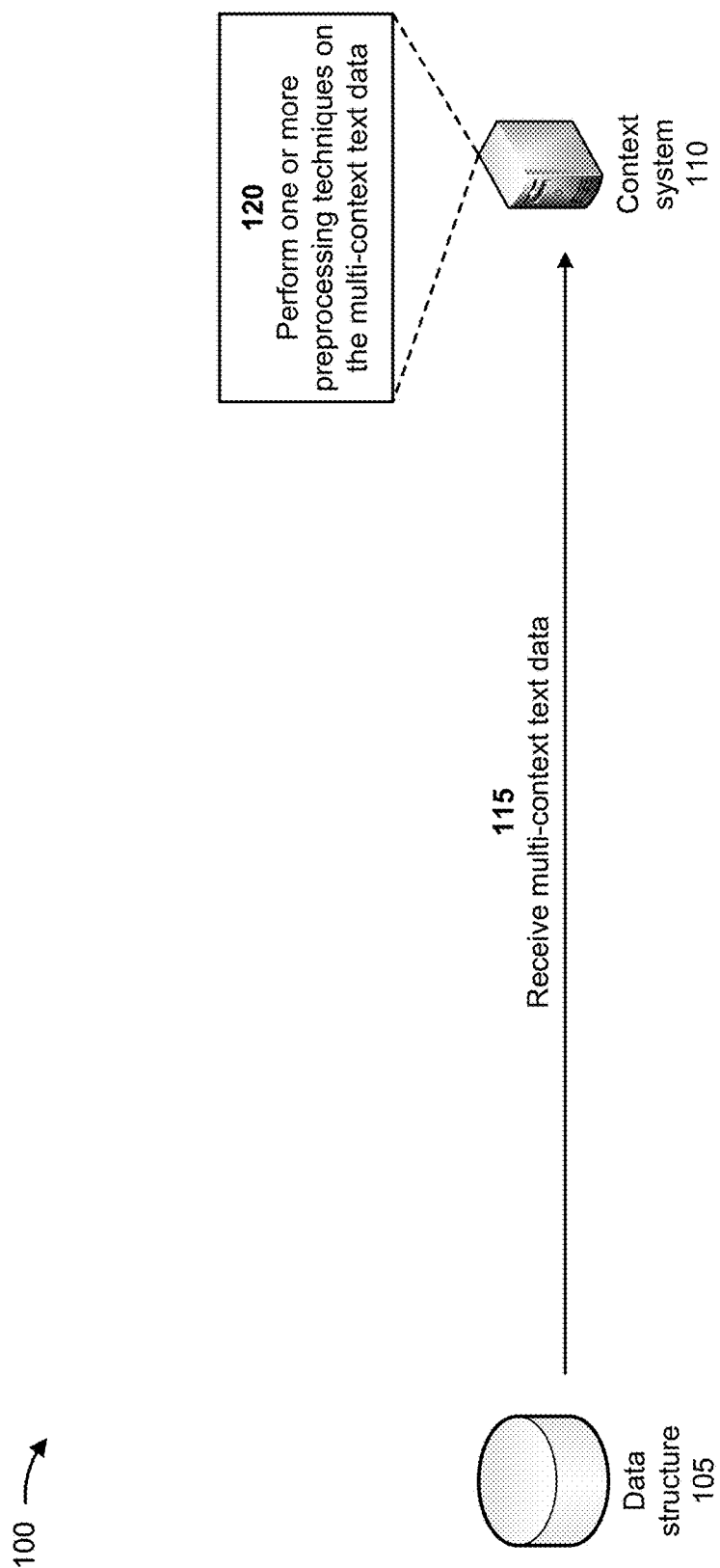
FIGS. 1A-1H are diagrams of an example associated with semantic separation of multiple intentions in text data using reinforcement learning.

The following detailed description of example implementations refers to the accompanying drawings. The same reference numbers in different drawings may identify the same or similar elements.

Customer-generated text has a wide range of context, and the importance of context depends on particular use cases. Context is information that helps a message of text data make sense. For example, a fact may support a claim or a quote to better illustrate an analysis of a literary work. Whenever a fact or a quote from another source is utilized, the context may provide a reader with information about the fact or the quote. Multi-context text data may include text data with a wide range of context that depends on particular use cases. Current natural language processing (NLP) techniques fail to assign appropriate importance to particular contexts due to varied and overlapping contexts associated with different use cases. For example, in call text data for problem handling (e.g., customer service calls for troubleshooting), current NLP techniques assign a high weight to past customer inferences for insight extraction. In contrast, in product review text data, current NLP techniques focus more on current product feedback to understand a potential of a product rather than details of an old product. In device reviews, many customers leave comments directly related to the performance of the device being reviewed. However, some customers leave comments that refer to previous versions of the device or different devices entirely, causing problems with NLP techniques. Overlapping contextual categories (e.g., device issues) may be present in such product review text data (e.g., either old device issues or current device issues). Current NLP techniques focus on current devices only for product review text data. However, ignoring old product inferences may bias current product feedback, which may adversely affect purchases of current products.

Thus, current NLP techniques for processing text data fail to assign importance to context when deriving relevant insights and consume computing resources (e.g., processing resources, memory resources, communication resources, and/or the like), networking resources, and/or other resources associated with generating poor customer insights associated with customer text data, generating poor predictions of customer purchase intent based on failing to assign importance to context when deriving customer insights, providing incorrect recommendations to a customer due to the poor customer insights, providing incorrect recommendations to an online purchasing system due to the poor customer insights, and/or the like.

Some implementations described herein provide a context system that provides semantic separation of multiple intentions in text data using reinforcement learning. For example, the context system may receive textual data that is meant to be associated with a particular entity, but has multiple contexts, and may identify, in the textual data, unrelated text that does not refer to the particular entity and coreference text that refers to the particular entity. The context system may extract coreference clusters, sentences, start positions, end positions, and sentiments from the coreference text, and may extract unrelated sentences from the unrelated text. The context system may assign tenses to the coreference sentences and the unrelated sentences to generate coreference tenses and unrelated tenses, and may extract phrases and entities from the coreference sentences and unrelated sentences to generate coreference phrases and entities and unrelated phrases and entities. The context system may assign tense flags that exclude present tense sentences from the coreference sentences and the unrelated sentences, and may select a set of past tense phrases and a set of future tense phrases based on the coreference tenses, the unrelated tenses, and the tense flags. The context system may combine the set of past tense phrases and the set of future tense phrases to generate a set of phrases, and may identify invalid phrases in the set of phrases based on relevancy to context. The context system may identify similarities between the coreference sentences and the invalid phrases, and may process the coreference text, tenses, and sentiments, and the similarities, with a reinforcement learning model, to generate final context text. The context system may generate one or more natural language processing insights based on the final context text.

In this way, the context system provides semantic separation of multiple intentions in text data using reinforcement learning. For example, the context system may derive coreference clusters to understand logical segments in multi-context text data based on entity, and group various sentences under a single coreference cluster. The context system may determine temporal variations (e.g., past, present, and future), and may extract phrases in sentences. The context system may validate and identify high frequency phrases (e.g., both past and future) as irrelevant phrases to a business context, and may identify sentences similar to the irrelevant phrases. The context system may provide the sentences similar to the irrelevant phrases to a reinforcement learning system that learns available states and actions and that performs proper actions (e.g., whether to include a coreference cluster) based on analyzing rewards. The reinforcement learning system may consider only relevant best portions of text (e.g., that exclude bias) and may generate final filtered business context text that may be utilized to generate further customer insights. Thus, the context system may conserve computing resources, networking resources, and/or other resources that would have otherwise been consumed by customer text data, generating poor predictions of customer purchase intent based on failing to assign importance to context when deriving customer insights, providing incorrect recommendations to a customer due to the poor customer insights, providing incorrect recommendations to an online purchasing system due to the poor customer insights, and/or the like.

FIGS. 1A-1H are diagrams of an example 100 associated with semantic separation of multiple intentions in text data using reinforcement learning. As shown in FIGS. 1A-1H, example 100 includes a data structure 105 associated with a context system 110. Further details of the data structure 105 and the context system 110 are provided elsewhere herein.

As shown in FIG. 1A, and by reference number 115, the context system 110 may receive multi-context text data. For example, the multi-context text data may be generated by customers via websites, social networks, blogs, online portals, reviews, opinions, recommendations, ratings, feedback, and/or the like. The multi-context text data may be retrieved and stored in the data structure 105 (e.g., a database, a table, a list, and/or the like). The context system 110 may receive the multi-context text data from the data structure 105. In some implementations, the context system 110 may continuously receive the multi-context text data from the data structure 105, may periodically receive the multi-context text data from the data structure 105, may receive the multi-context text data from the data structure 105 based on providing a request to the data structure 105, and/or the like. In some implementations, the multi-context text data may include text data with a wide range of context that depends on particular use cases.

Although text data is shown and described, in some implementations, the multi-context text data may include multi-context audio data, multi-context image data, multi-context video data, and/or the like. In such implementations, the context system 110 may convert the multi-context audio data, the multi-context image data, the multi-context video data, and/or the like into the multi-context text data.

As further shown in FIG. 1A, and by reference number 120, the context system 110 may perform one or more preprocessing techniques on the multi-context text data. For example, the context system 110 may preprocess the multi-context text data with one or more of a noise removal technique, a tokenization technique, a normalization technique, a stopword removal technique, a stemming technique, a lemmatization technique, a part-of-speech tagging technique, and/or the like. The noise removal technique may remove unwanted information, such as punctuation and accents; special characters; numeric digits; leading, ending, and vertical whitespace; webpage formatting, and/or the like. The tokenization technique may include dividing text into smaller components (e.g., tokens), such as words, terms, phrases, sentences or other size pieces of text. The normalization technique may include a process of transforming text into a single canonical form that the text might not have had before. The stopword removal technique may include removing stopwords (e.g., most common words in a language that do not provide any information about a tone of a statement, such as "a," "an," and "the") from text. The stemming technique may include a text preprocessing normalization task concerned with removing word affixes (e.g., prefixes and suffixes). The lemmatization technique may include casting words to root forms based on a part of speech for the words. The part-of-speech tagging technique may include identifying a part of speech for each word in text.

Figure 1B:
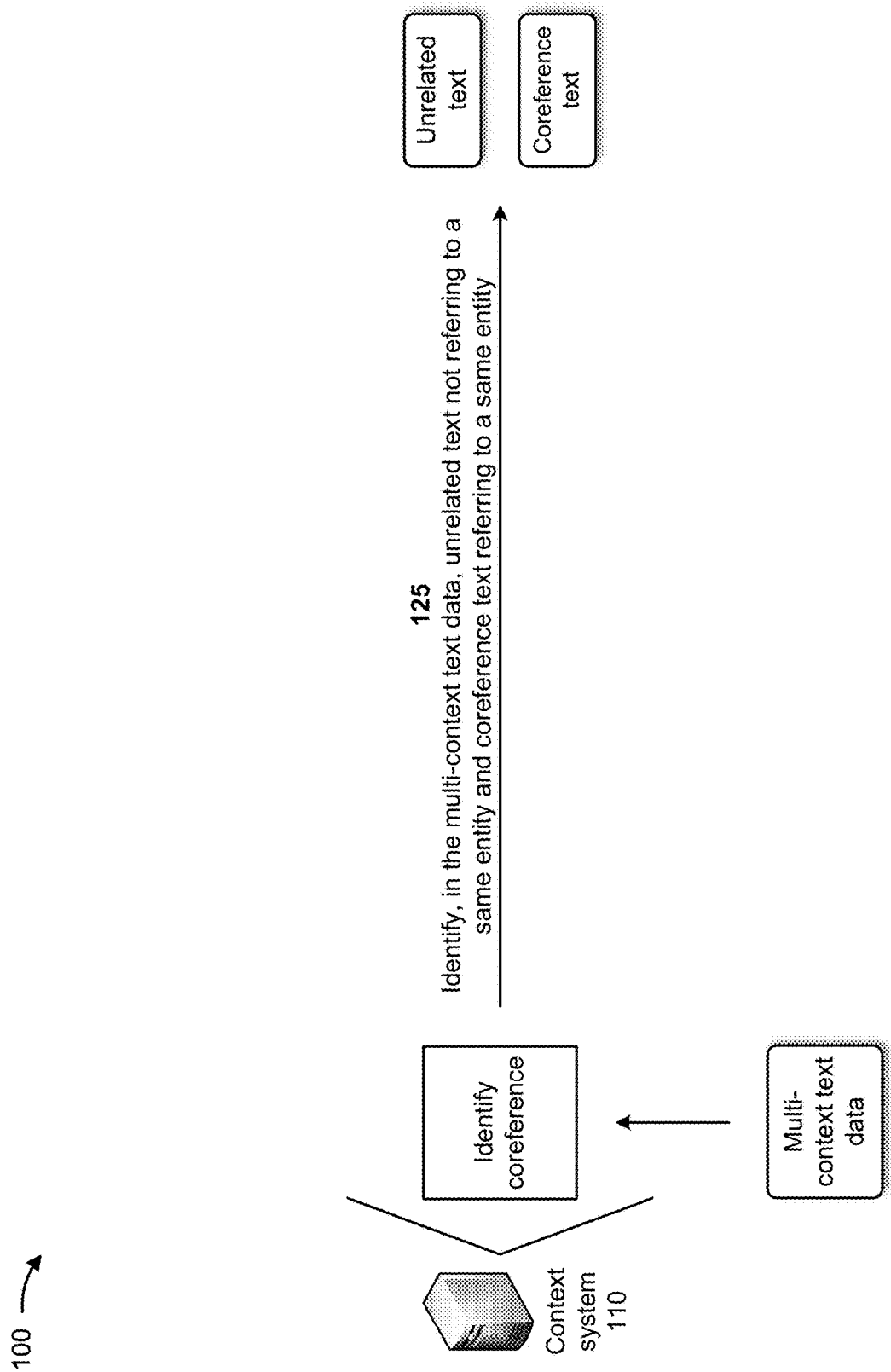

As shown in FIG. 1B, and by reference number 125, the context system 110 may identify, in the multi-context text data, unrelated text not referring to a particular entity (e.g., a new device) and coreference text referring to the particular entity. For example, the multi-context text data may include text that does not refer to a same entity (e.g., a reference entity, such as new device) and text that refers to a same entity. The text that does not refer to a same entity (e.g., text that refers to an old device) may be referred to as unrelated text (e.g., no coreference text). Unrelated text occurs when two or more phrases fail to refer to a same entity. For example, in the text "my old telephone was great, but I love my laptop more," there is no common entity (e.g., the old telephone is different than the laptop) and the text is unrelated text. In some implementations, the context system 110 may analyze the preprocessed multi-context text data to identify entities, and may identify unrelated text that fails to refer to the same entities.

The text that refers to a same entity may be referred to as coreference text. Coreference text occurs when two or more phrases refer to a same entity (e.g., a person, place, or thing). For example, in the text "the post office said the telephone would arrive soon, and it did," the words "telephone" and "it" refer to the same thing (e.g., the telephone). In some implementations, the context system 110 may analyze the preprocessed multi-context text data to identify entities, and may identify the coreference text that refers to the same entities. In some implementations, the context system 110 may utilize coreference resolution to identify the unrelated text and the coreference text in the multi-context text data. Coreference resolution may include identifying all linguistic expressions (e.g., called mentions) in text that refer to a same real-world entity.

Figure 1C:
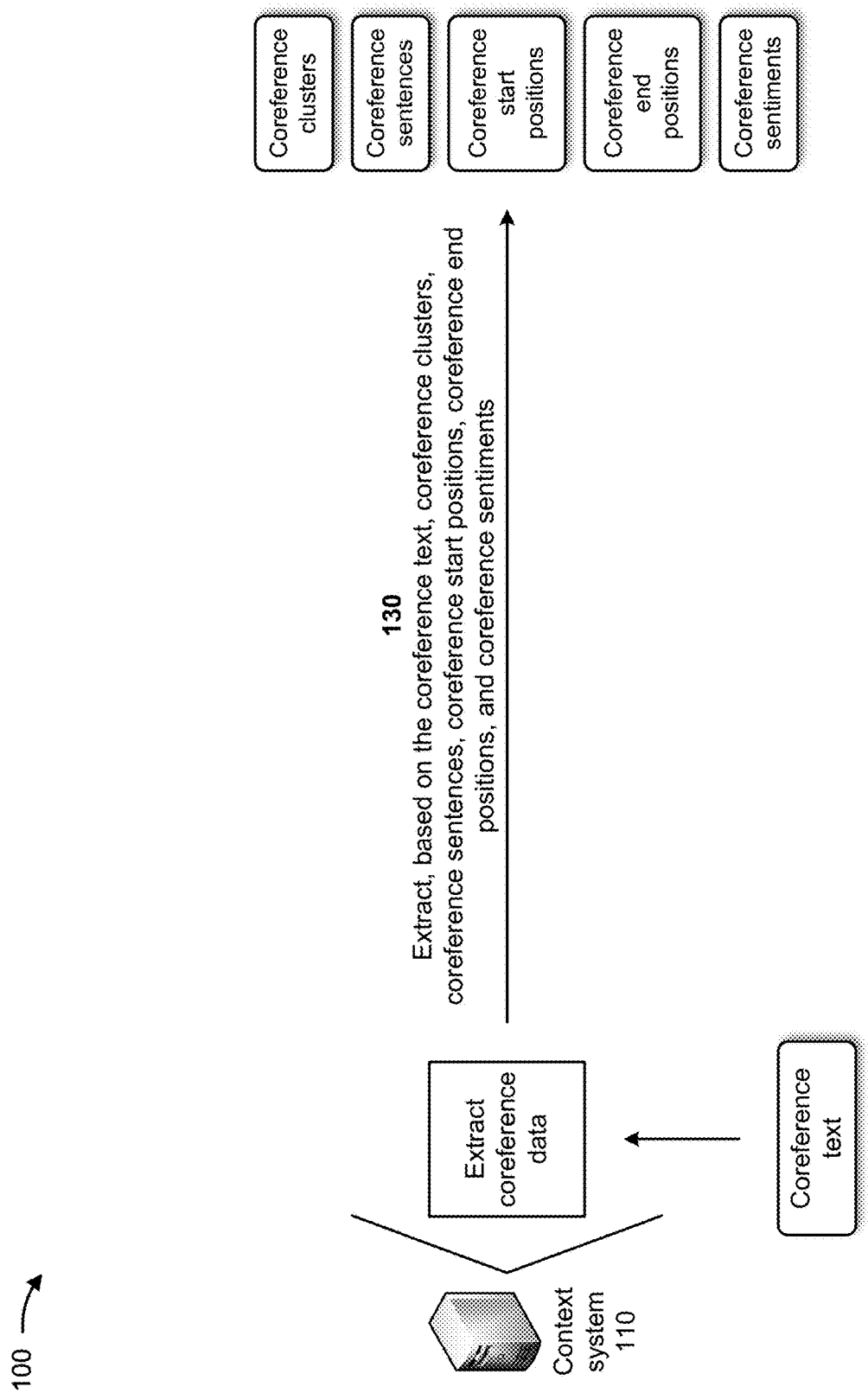

As shown in FIG. 1C, and by reference number 130, the context system 110 may extract, based on the coreference text, coreference clusters (e.g., clusters of text that refer to the same reference entity), coreference sentences (e.g., sentences of text that refer to the same reference entity), coreference start positions, coreference end positions, and coreference sentiments. For example, the context system 110 may extract the coreference clusters from the coreference text by creating coreference chains with agglomerative clustering. A coreference chain is a set of all expressions of a text that refer to a same referent (e.g., referring expressions). Agglomerative clustering is a type of hierarchical clustering model, and is an unsupervised machine learning model that divides a population into several clusters such that data points in a same cluster are more similar and data points in different clusters are dissimilar. With agglomerative clustering, each mention of an entity may create a cluster and then pairs of the clusters may be merged into a coreference cluster. The context system 110 may identify sentences that include the coreference text, and may extract the sentences, that include the coreference text, as coreference sentences. The context system 110 may identify start positions of the sentences that include the coreference text, and may extract the start positions as coreference start positions. The context system 110 may identify end positions of the sentences that include the coreference text, and may extract the end positions as coreference end positions.

In some implementations, the context system 110 may perform a sentiment analysis of the coreference text to extract the coreference sentiments associated with the coreference text. For example, the context system 110 may utilize knowledge-based sentiment analysis, statistical sentiment analysis, and/or hybrid sentiment analysis. Knowledge-based sentiment analysis may classify text by affect categories (e.g., particular emotions, such as happy, sad, and/or the like) based on a presence of unambiguous affect words (e.g., happy, sad, afraid, bored, and/or the like). Statistical sentiment analysis may include utilizing one or more machine learning models, such as a latent semantic analysis model, a support vector machine (SVM) model, a bag of words model, a pointwise mutual information model, a semantic space model, a word embedding model, a deep learning model, and/or the like. Hybrid sentiment analysis may include utilizing machine learning models and elements from knowledge representation, such as ontologies and semantic networks, in order to detect semantics that are expressed in a subtle manner.

Figure 1D:
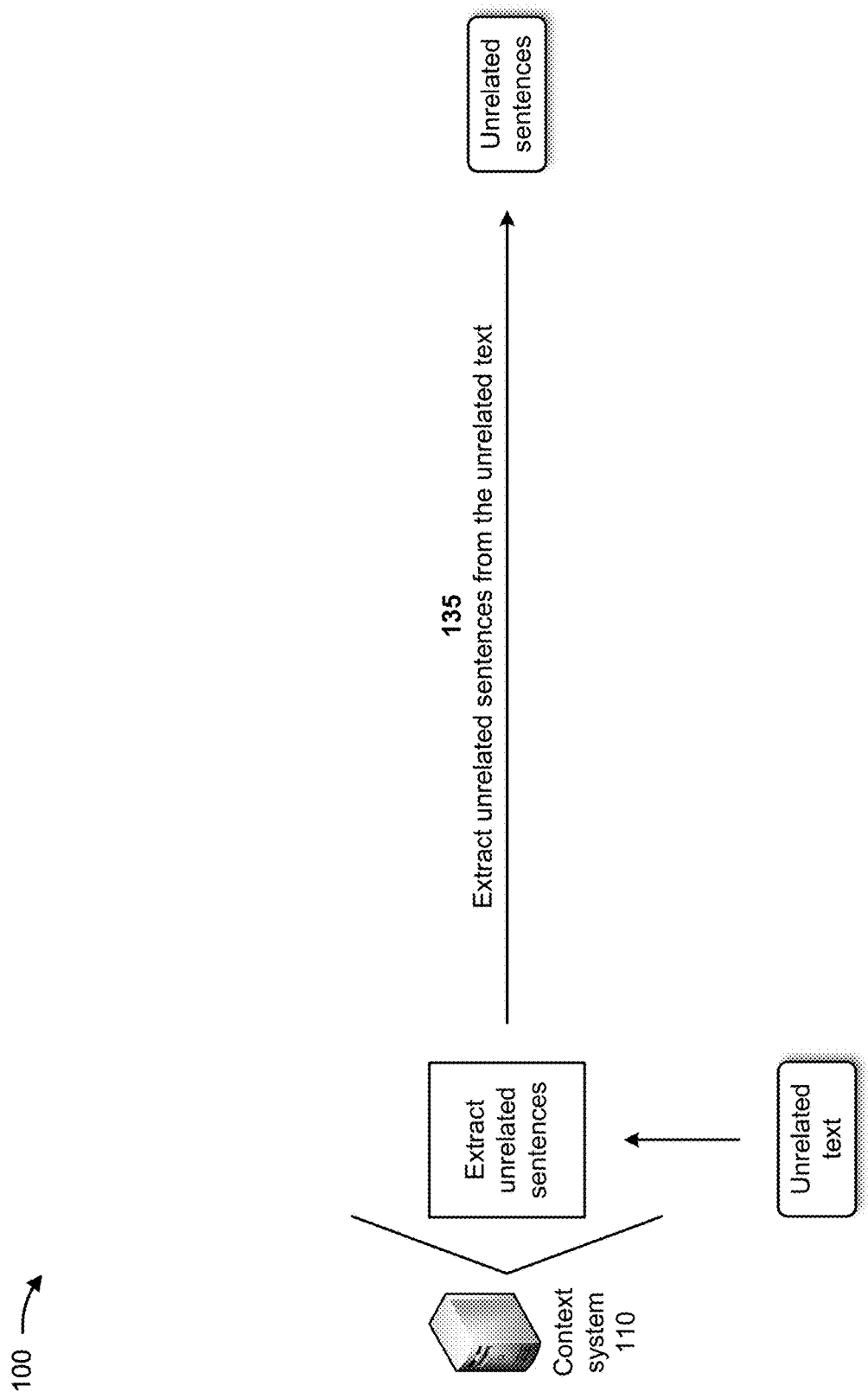

As shown in FIG. 1D, and by reference number 135, the context system 110 may extract unrelated sentences from the unrelated text. For example, the context system 110 may identify sentences that include the unrelated text and may extract the sentences that include the unrelated text as unrelated sentences. In some implementations, the context system 110 may designate, as the unrelated sentences, sentences of the multi-context text data that are not extracted as coreference sentences.

Figure 1E:
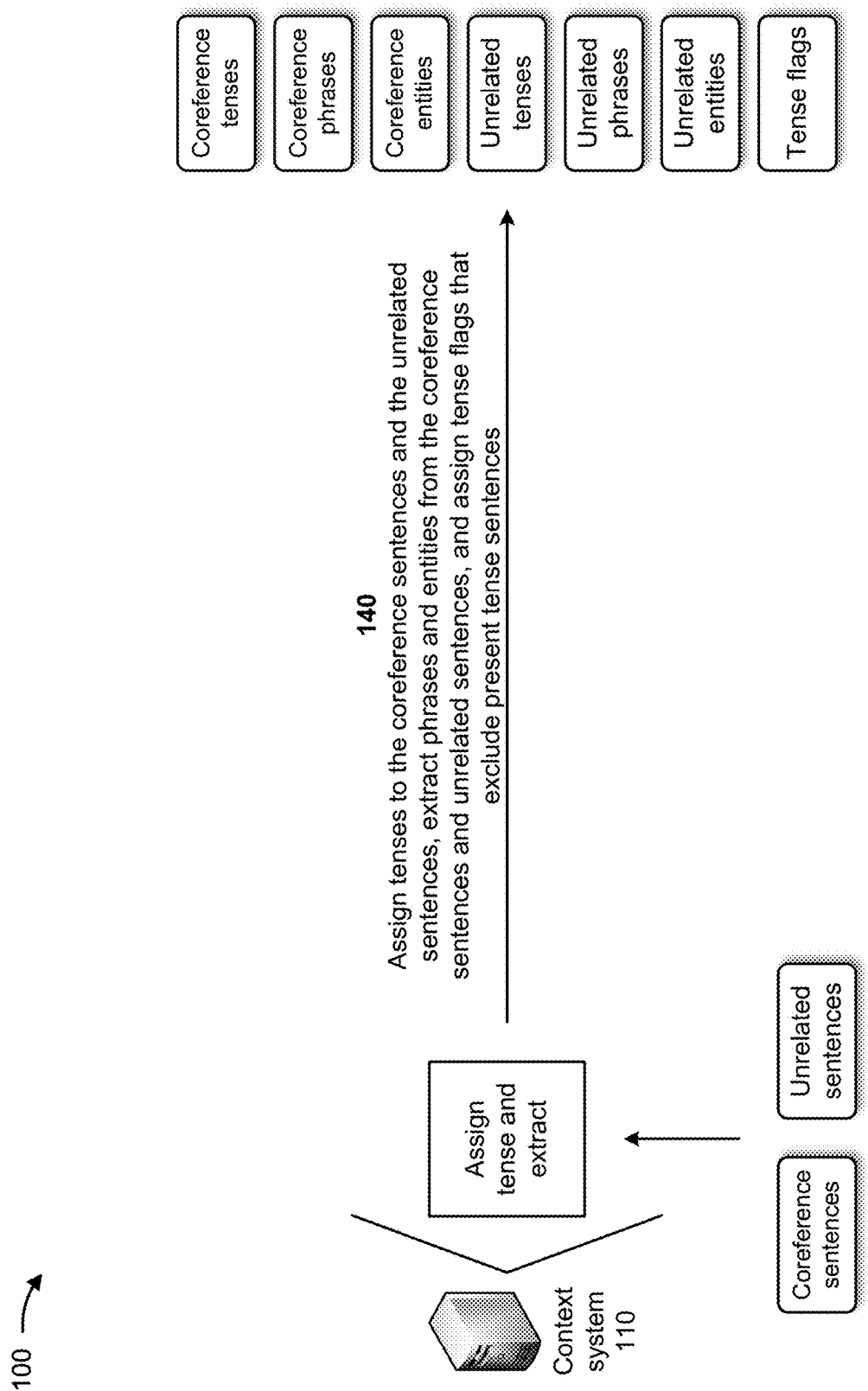

As shown in FIG. 1E, and by reference number 140, the context system 110 may assign tenses to the coreference sentences and the unrelated sentences, may extract phrases and entities from the coreference sentences and unrelated sentences, and may assign tense flags that exclude present tense sentences. For example, the context system 110 may utilize a machine learning model to determine and assign tenses (e.g., past, present, or future) to the coreference sentences and the unrelated sentences. The machine learning model may include a naive Bayes model, a long short-term memory (LSTM) model, a bidirectional encoder representations from transformers (BERT) model, and/or the like. The context system 110 may process the coreference sentences and the unrelated sentences, with the machine learning model, to determine the tenses for the coreference sentences and the unrelated sentences, and may assign the determined tenses to the coreference sentences and the unrelated sentences. This may result in past tense sentences, present tense sentences, and future tense sentences of the coreference sentences and the unrelated sentences.

In some implementations, the context system 110 may identify the phrases and the entities in the coreference sentences, and may extract the phrases and the entities as coreference phrases and coreference entities. The context system 110 may identify the phrases and the entities in the unrelated sentences, and may extract the phrases and the entities as unrelated phrases and unrelated entities. In some implementations, when assigning the tense flags that exclude the present tense sentences from the coreference sentences and the unrelated sentences, the context system 110 may assign first tense flags (e.g., with a first value) to the past tense sentences and the future tense sentences of the coreference sentences and the unrelated sentences. The context system 110 may assign second tense flags (e.g., with a second value that is different than the first value) to the present tense sentences of the coreference sentences and the unrelated sentences. In some implementations, the context system 110 may utilize the second tense flags to exclude the present tense sentences from the coreference sentences and the unrelated sentences.

Figure 1F:
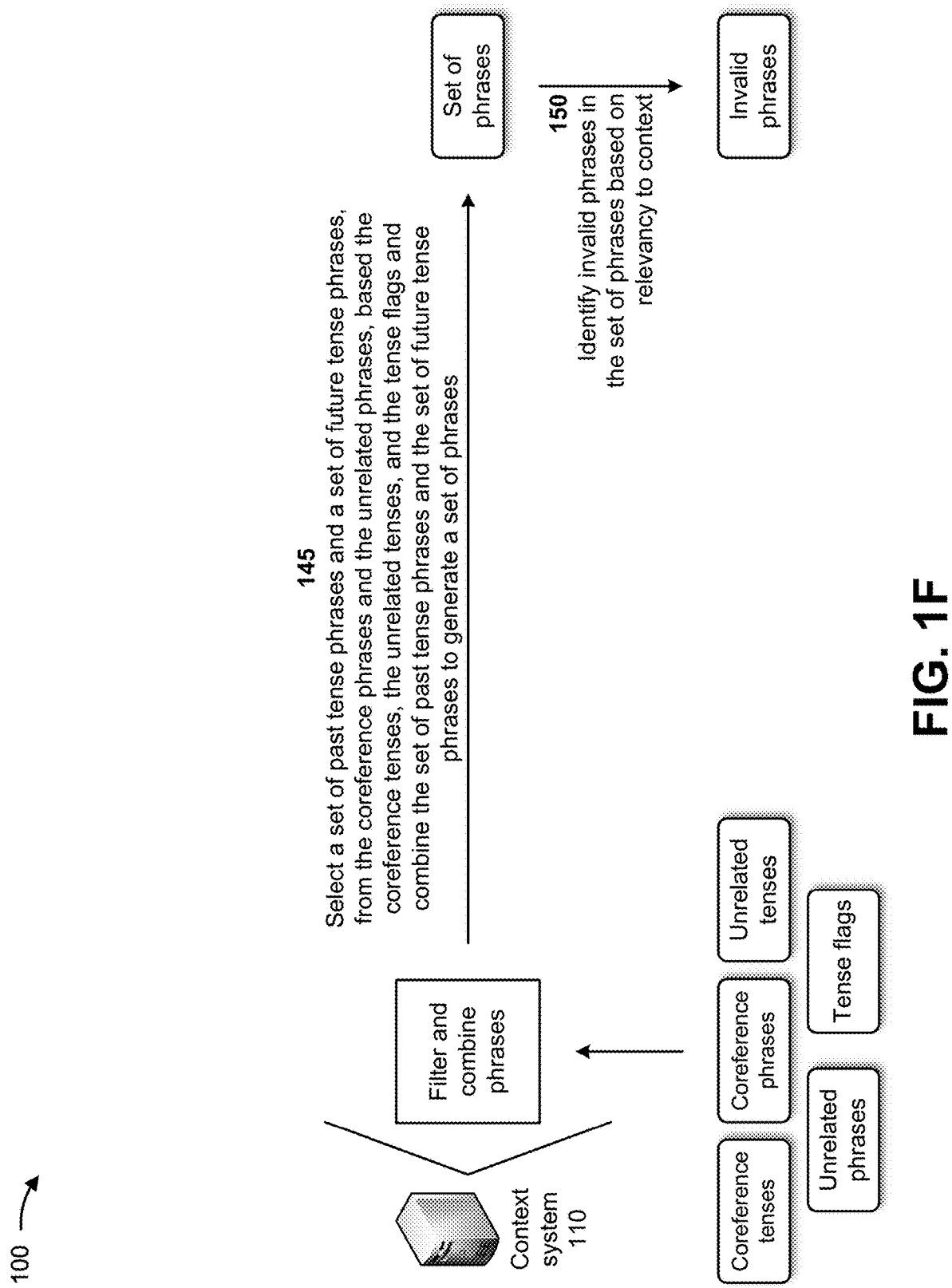

As shown in FIG. 1F, and by reference number 145, the context system 110 may select a set of past tense phrases and a set of future tense phrases, from the coreference phrases and the unrelated phrases, based on the coreference tenses, the unrelated tenses, and the tense flags. The context system 110 may combine the set of past tense phrases and the set of future tense phrases to generate a set of phrases. For example, the context system 110 may identify the past tense phrases, of the coreference phrases and the unrelated phrases, based on the coreference tenses, the unrelated tenses, and the tense flags. The context system 110 may identify the future tense phrases, of the coreference phrases and the unrelated phrases, based on the coreference tenses, the unrelated tenses, and the tense flags.

The context system 110 may rank the past tense phrases based on a quantity of times the past tense phrases occur in the coreference phrases and the unrelated phrases, and may select a threshold top percentage (e.g., a threshold top five percent, ten percent, or the like) of the ranked past tense phrases as the set of past tense phrases. The context system 110 may rank the future tense phrases based on a quantity of times the future tense phrases occur in the coreference phrases and the unrelated phrases, and may select a threshold top percentage (e.g., a threshold top five percent, ten percent, or the like) of the ranked future tense phrases as the set of future tense phrases. The context system 110 may combine the set of past tense phrases and the set of future tense phrases to generate a set of phrases.

As further shown in FIG. 1F, and by reference number 150, the context system 110 may identify invalid phrases in the set of phrases based on relevancy to context. For example, context in language is what surrounds a word or piece of text. In text, a word, a phrase, or a sentence has other text around it which helps a reader to understand the text in question. The context system 110 may perform a context analysis of the multi-context text data to determine contexts of the multi-context text data. Context analysis in natural language processing involves parsing sentences into n-grams and noun phrases to extract themes and facets within the multi-context text data. In some implementations, the context system 110 may determine the contexts based on an ambiguity of language utilized in the multi-context text data, the use of jargon within a given context, the use of synonyms to mean the same thing, and/or reference to topics not explicitly included in the multi-context text data.

The context system 110 may compare the set of phrases to the identified contexts, and may identify phrases, in the set of phrases, that are relevant to the identified contexts based on comparing the set of phrases to the identified contexts. The context system 110 may determine that the identified phrases, in the set of phrases, that are relevant to the identified contexts to be valid phrases. The context system 110 may identify phrases, in the set of phrases, which are not relevant to the identified contexts based on comparing the set of phrases to the identified contexts. The context system 110 may determine that the identified phrases, in the set of phrases, are not relevant to the identified contexts to be the invalid phrases.

In some implementations, when identifying the invalid phrases in the set of phrases based on the relevancy to the context, the context system 110 may determine valid phrases relevant to the context in the set of phrases, and may determine the invalid phrases not relevant to the context in the set of phrases. The context system 110 may assign a first value to the valid phrases, and may assign a second value to the invalid phrases.

Figure 1G:
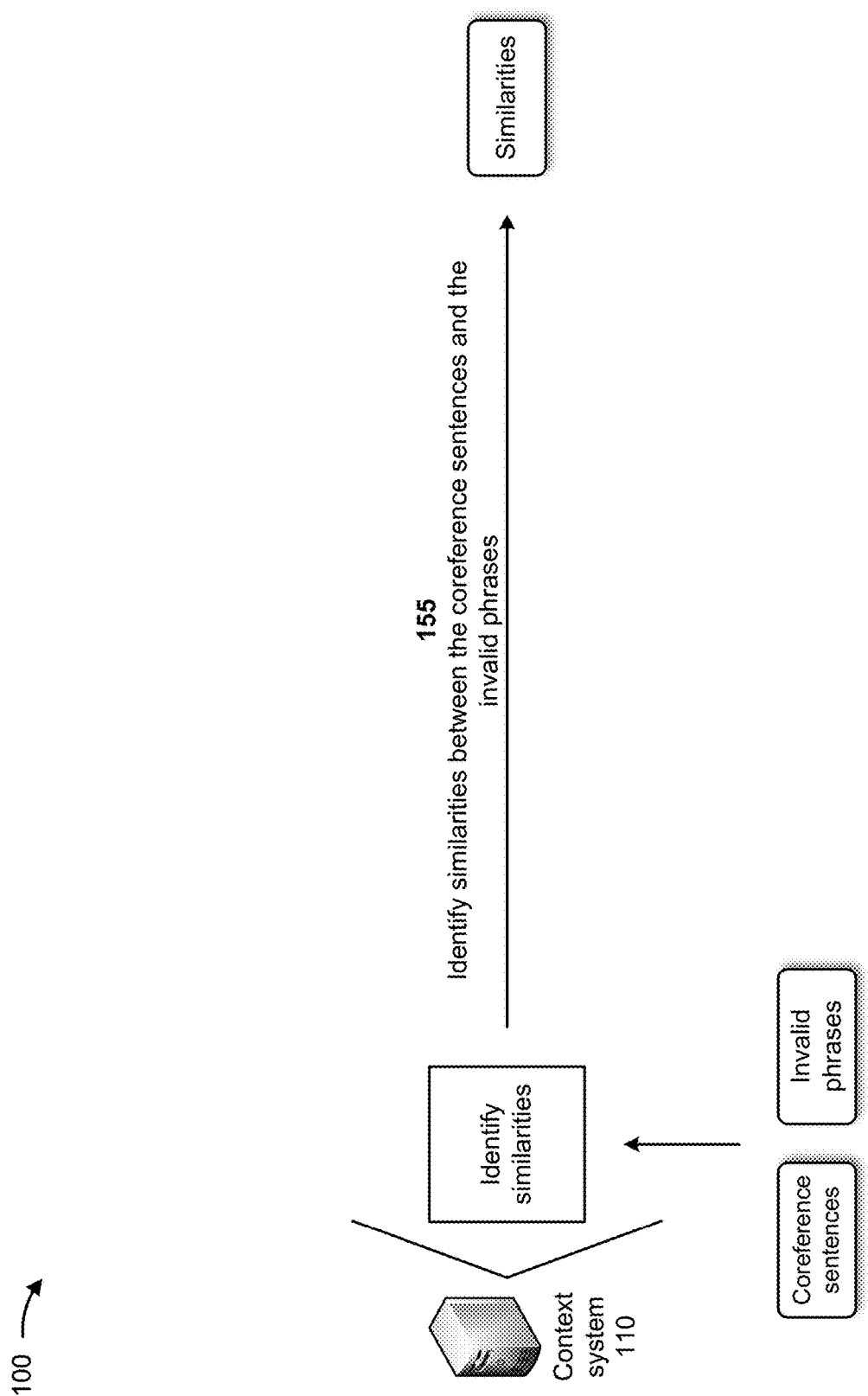

As shown in FIG. 1G, and by reference number 155, the context system 110 may identify similarities between the coreference sentences and the invalid phrases. For example, the context system 110 may compare coreference phrases, included in the coreference sentences, and the invalid phrases, and may identify the similarities between the coreference sentences and the invalid phrases based on comparing the coreference phrases, included in the coreference sentences, and the invalid phrases. In some implementations, the context system 110 may calculate similarity scores indicating the similarities between the coreference sentences and the invalid phrases. In some implementations, if the context system 110 determines that a coreference sentence is more similar to an invalid phrase (e.g., a similarity score greater a threshold, such as 50%, 60%, and/or the like), the context system 110 may determine that the coreference sentence is not relevant to the contexts of the multi-context text data. Alternatively, if the context system 110 determines that a coreference sentence is less similar to an invalid phrase (e.g., a similarity score that is less than a threshold, such as 20%, 10%, and/or the like), the context system 110 may determine that the coreference sentence is relevant to the contexts of the multi-context text data.

Figure 1H:
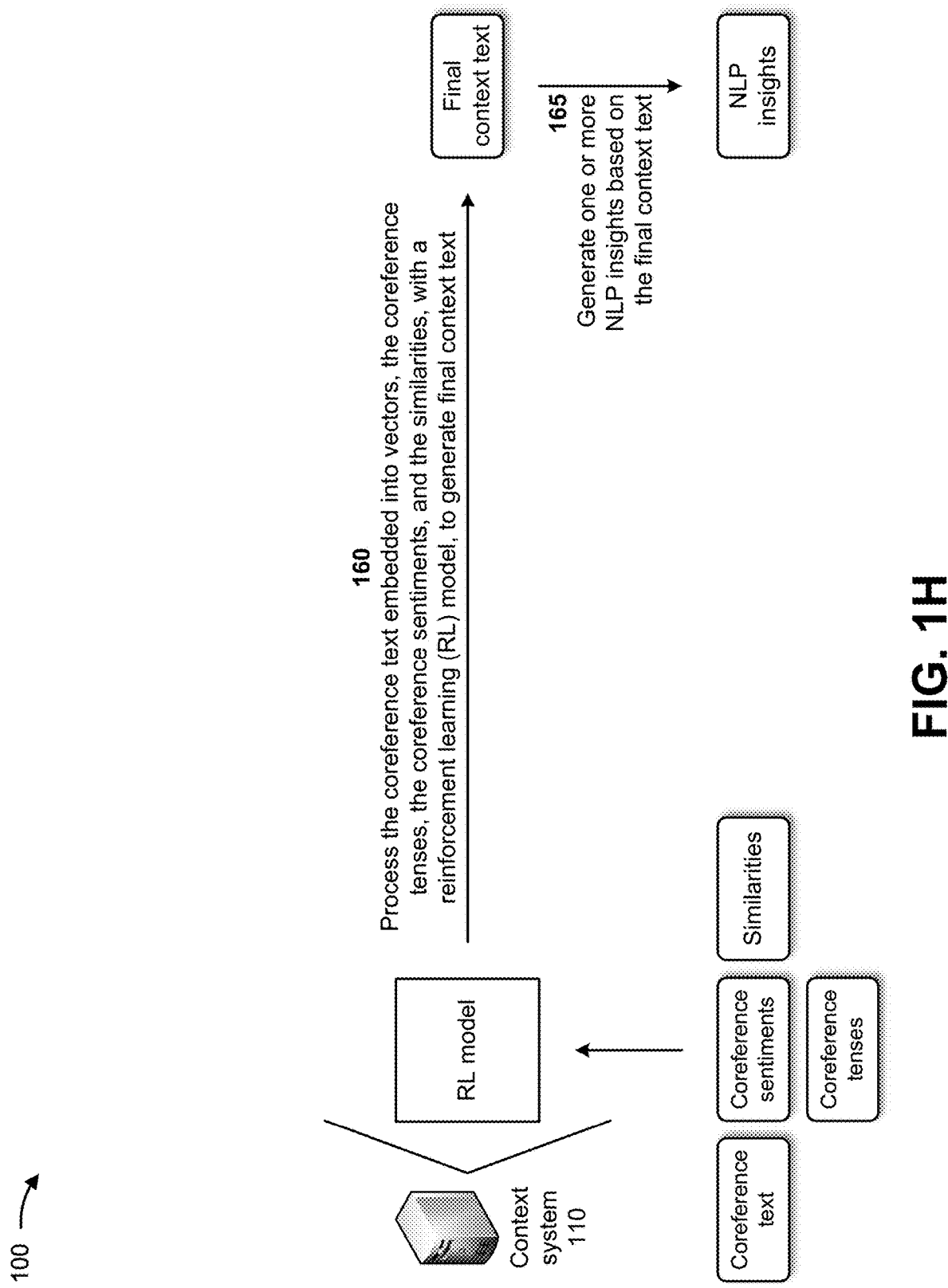

As shown in FIG. 1H, and by reference number 160, the context system 110 may process the coreference text embedded into vectors, the coreference tenses, the coreference sentiments, and the similarities, with a reinforcement learning (RL) model, to generate final context text. For example, the context system 110 may utilize a reinforcement learning model, such as a deep reinforcement learning model (e.g., a deep Q-learning model) to process the coreference text embedded into vectors, the coreference tenses, the coreference sentiments, and the similarities, and to generate final context text. In some implementations, the final context text may include text associated with present tense sentiment, may include text associated with relevant context, and/or the like.

For example, for text, such as "I like the previous device. It works very well always. But I bought a new device. It really has given worst experience in overall," and a use case of "Product Review Sentiment," then the coreference resolved sentence may be "I like the previous device. The previous device works very well always. But I bought the new device. The new device really has given worst experience in overall." An input of the model may include vectors. A vectorization (e.g., a word to numerical conversion) of the above input may include [3, 4, 5, 23, 23, 34, 24, 56, 22, 3, 25, 12, 14, 67, 67, 87, 32, 1, 28, 87, 68, 89]. Tenses may be decoded as past=1, present tense=2, and future tense=3. Derived entities may include "the previous device" and "the new device," and associations may include "like, work, well, and worst." The input of the model is [Tense, Sentiment, Total words, Total entity found in entity bank/Total words at overall level (TEF), and Total entity association found/Total words within cluster at coreference cluster level (TAF)] or [[1, 0.67, 9, 2/22, 4/22], [1, −0.63, 9, 2/22, 4/22]]. Therefore, when inputs are supplied to the deep learning model present within a policy of reinforcement-learning model, an agent trains the model with initial state as zero and receives initial random predictions (e.g., [1, 0]). In this case, a first coreference cluster is about the previous device so the prediction is wrong. Hence a penalty is received for an action by the agent. Then in a next iteration, state has changed with updated learnings by the agent and the prediction is [0, 1]. Now the result is correct therefore the agent is rewarded for correct prediction. Finally, the output is received as [0, 1]. Thus, the text "But I bought the new device. The new device really has given worst experience in overall" is selected as the best text for further analysis in product review sentiment.

In some implementations, the context system 110 may generate vectors and may embed the coreference text in the vectors. When processing the coreference text, the coreference tenses, the coreference sentiments, and the similarities, with the reinforcement learning model, to generate the final context text, the context system may process the vectors, the coreference tenses, the coreference sentiments, and the similarities, with the reinforcement learning model, to generate the final context text.

In some implementations, the context system 110 may calculate a first value based on a total quantity of words in the coreference text, and may calculate a second value (e.g., a total entity found (TEF) value) based on dividing a total quantity of entities identified in an entity bank divided by the total quantity of words. The context system 110 may calculate a third value (e.g., a total entity association found (TAF) value) based on dividing a total quantity of entities identified in an association bank by a total quantity of words in the coreference clusters. The context system 110 may process the coreference text, the coreference tenses, the coreference sentiments, the similarities, the first value, the second value, and the third value, with the reinforcement learning model, to generate the final context text.

In one example, if the multi-context text data states: "I like previous device A. It works very well always. I thought to try device B. It really gives a varying experience in overall," the context system 110 may identify two entity clusters (e.g., a first cluster for device A and a second cluster for device B). The context system 110 may generate a first cluster resolved sentence (e.g., "I like previous device A. Device A works very well always.") and a second cluster resolved sentence (e.g., "I thought to try device B. Device B really gives a varying experience in overall."). The context system 110 may identify an entity bank (e.g., that includes device A and device B) and an association bank (e.g., that includes the words "like," "work," "try," "experience," and "want"). The context system 110 identify invalid phrases (e.g., "like previous device A"); a total quantity of words (e.g., 22), a TEF value (e.g., 7/23); and a TAF value (e.g., 4 ("like," "device A," "device A," and "works")/9, 4 ("try," "device B," "device B," and "experience")/13). The reinforcement learning model may generate the final context text as "I thought to try device B. Device B really gives a varying experience in overall."

As further shown in FIG. 1H, and by reference number 165, the context system 110 may generate one or more NLP insights based on the final context text. For example, the context system 110 may generate, as the one or more natural language processing insights, an identification of a topic associated with the multi-context text data, an identification of a sentiment associated with the multi-context text data, a summary of the multi-context text data, and/or the like, based on the final context text. In some implementations, the context system 110 may identify relevant context in the multi-context text data, and may provide actual insights into areas of interest while eliminating context that is not of interest. By identifying the final context text based on coreference, the context system 110 may group sentences into a particular group with time bounded in the particular group. This may remove irrelevant groups of sentences that cause bias in the one or more NLP insights. By eliminating irrelevant context, the context system 110 may derive meaningful and accurate topics, sentiment, phrases, and/or the like associated with context of interest.

In this way, the context system 110 provides semantic separation of multiple intentions in text data using reinforcement learning. For example, the context system 110 may derive coreference clusters to understand logical segments in multi-context text data based on entity, and group various sentences under single coreference cluster. The context system 110 may determine temporal variations (e.g., past, present, and future), and may extract phrases in sentences. The context system 110 may validate and identify high frequency phrases (e.g., both past and future) as irrelevant phrases to a business context, and may identify sentences similar to the irrelevant phrases. The context system 110 may provide the sentences similar to the irrelevant phrases to a reinforcement learning system that learns available states and actions and that performs proper actions (e.g., whether to include a coreference cluster) based on analyzing rewards. The reinforcement learning system may consider only relevant best portions of text (e.g., that excludes bias) and may generate final filtered business context text that may be utilized to generate further customer insights. The final context text may be utilized with any NLP model which results in an outcome without bias based on a use case. If sentiment is derived, topic extraction is performed, phrase extraction is performed, and/or the like, using this data, the outcome generated may an actual voice of customer thoughts for a use case and a business can prioritize the most relevant actions based on importance and frequency of outcome. For example, if the use case is a product review sentiment, then the sentiment of a current product has more importance than a sentiment of a previous device. For example, in the text "This phone bends if so much as breath heavy on it. Honestly I was happier with my previous note. It was awesome and is still in great shape years later," the most relevant context is "This phone bends if so much as breath heavy on it" for the product review sentiment and the rest of the text should be ignored.

Thus, the context system 110 may conserve computing resources, networking resources, and/or other resources that would have otherwise been consumed by customer text data, generating poor predictions of customer purchase intent based on failing to assign importance to context when deriving customer insights, providing incorrect recommendations to a customer due to the poor customer insights, providing incorrect recommendations to an online purchasing system due to the poor customer insights, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
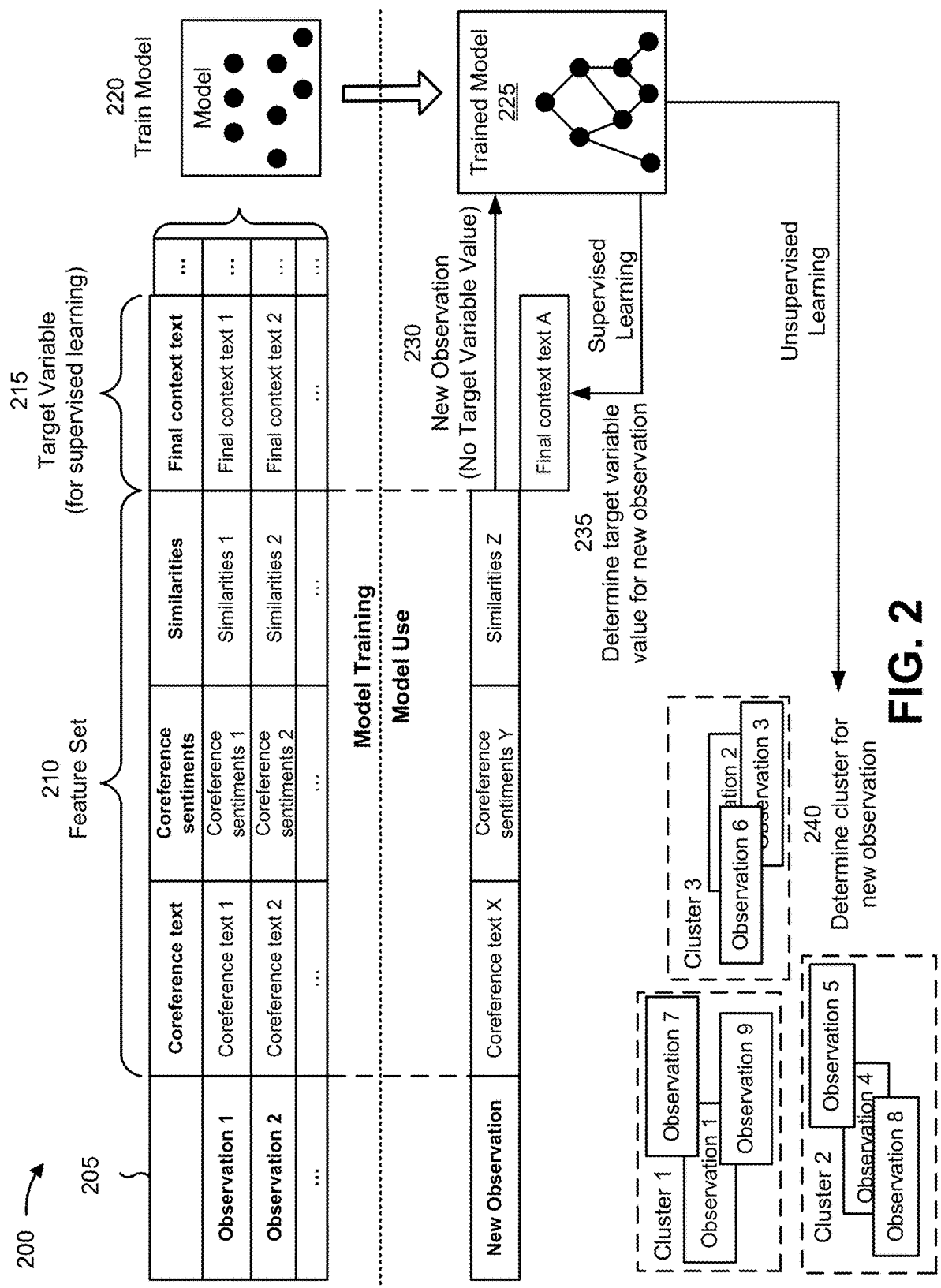
FIG. 2 is a diagram illustrating an example of training and using a machine learning model.

FIG. 2 is a diagram illustrating an example 200 of training and using a machine learning model to provide semantic separation of multiple intentions in text data using reinforcement learning. The machine learning model training and usage described herein may be performed using a machine learning system. The machine learning system may include or may be included in a computing device, a server, a cloud computing environment, and/or the like, such as the context system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the context system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the context system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of coreference text, a second feature of coreference sentiments, a third feature of similarities, and so on. As shown, for a first observation, the first feature may have a value of coreference text 1, the second feature may have a value of coreference sentiments 1, the third feature may have a value of similarities 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled "final context text" and may include a value of final context text 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of coreference text X, a second feature of coreference sentiments Y, a third feature of similarities Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of final context text A for the target variable of the final context text for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a coreference text cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a coreference sentiments cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to provide semantic separation of multiple intentions in text data using reinforcement learning. The machine learning system enables recognition and/or identification of tens, hundreds, thousands, or millions of features and/or feature values for tens, hundreds, thousands, or millions of observations, thereby increasing accuracy and consistency and reducing delay associated with providing semantic separation of multiple intentions in text data using reinforcement learning relative to requiring computing resources to be allocated for tens, hundreds, or thousands of operators to manually provide semantic separation of multiple intentions in text data using reinforcement learning.

As indicated above, FIG. 2 is provided as an example. Other examples may differ from what is described in connection with FIG. 2.

Figure 3:
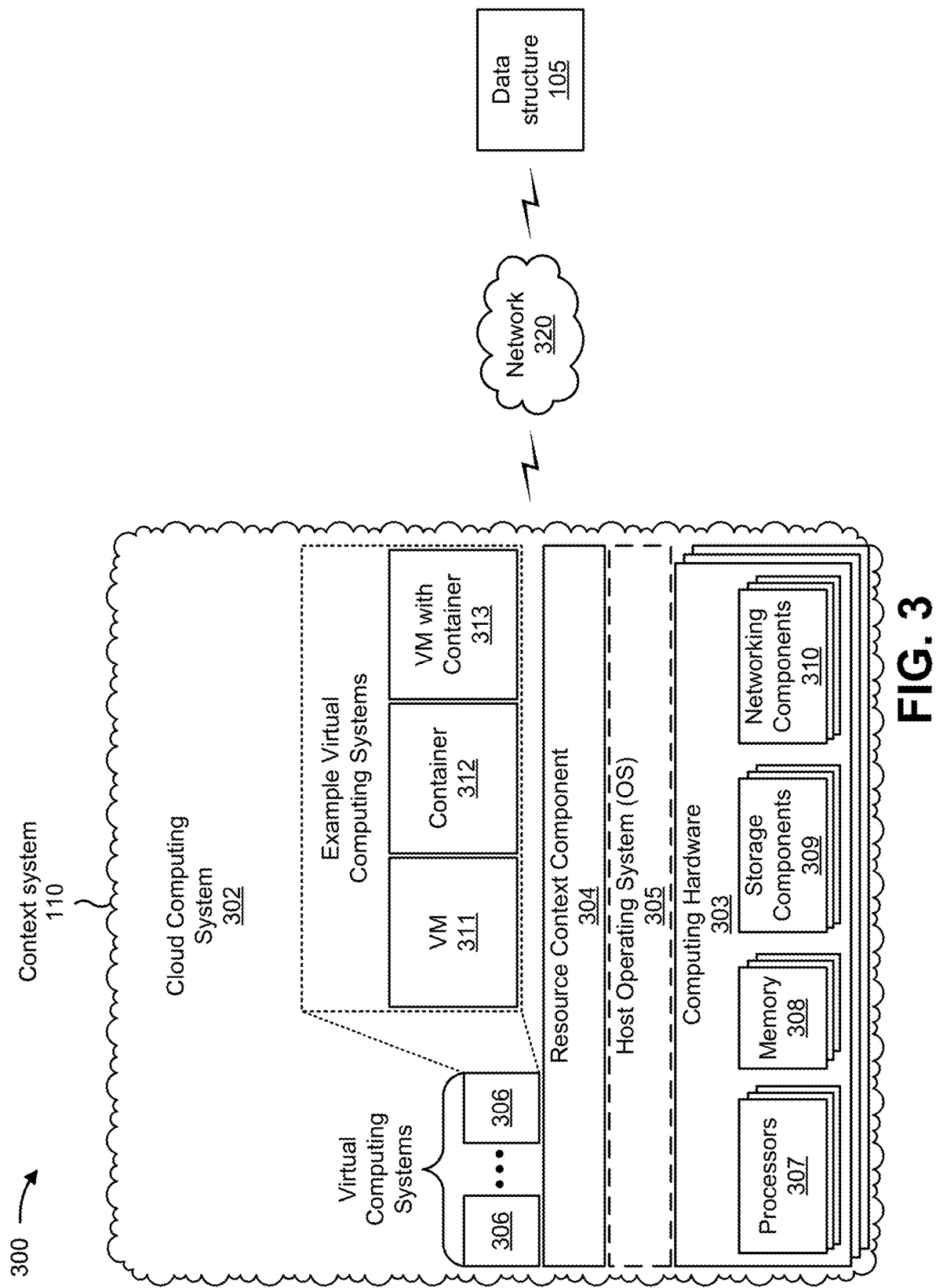
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the context system 110, which may include one or more elements of and/or may execute within a cloud computing system 302. The cloud computing system 302 may include one or more elements 303-313, as described in more detail below. As further shown in FIG. 3, the environment 300 may include the data structure 105 and/or a network 320. Devices and/or elements of the environment 300 may interconnect via wired connections and/or wireless connections.

The data structure 105 may include one or more devices capable of receiving, generating, storing, processing, and/or providing information, as described elsewhere herein. The data structure 105 may include a communication device and/or a computing device. For example, the data structure 105 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 105 may communicate with one or more other devices of the environment 300, as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the context system 110 may include one or more elements 303-313 of the cloud computing system 302, may execute within the cloud computing system 302, and/or may be hosted within the cloud computing system 302, in some implementations, the context system 110 may not be cloud-based (e.g., may be implemented outside of a cloud computing system) or may be partially cloud-based. For example, the context system 110 may include one or more devices that are not part of the cloud computing system 302, such as the device 400 of FIG. 4, which may include a standalone server or another type of computing device. The context system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
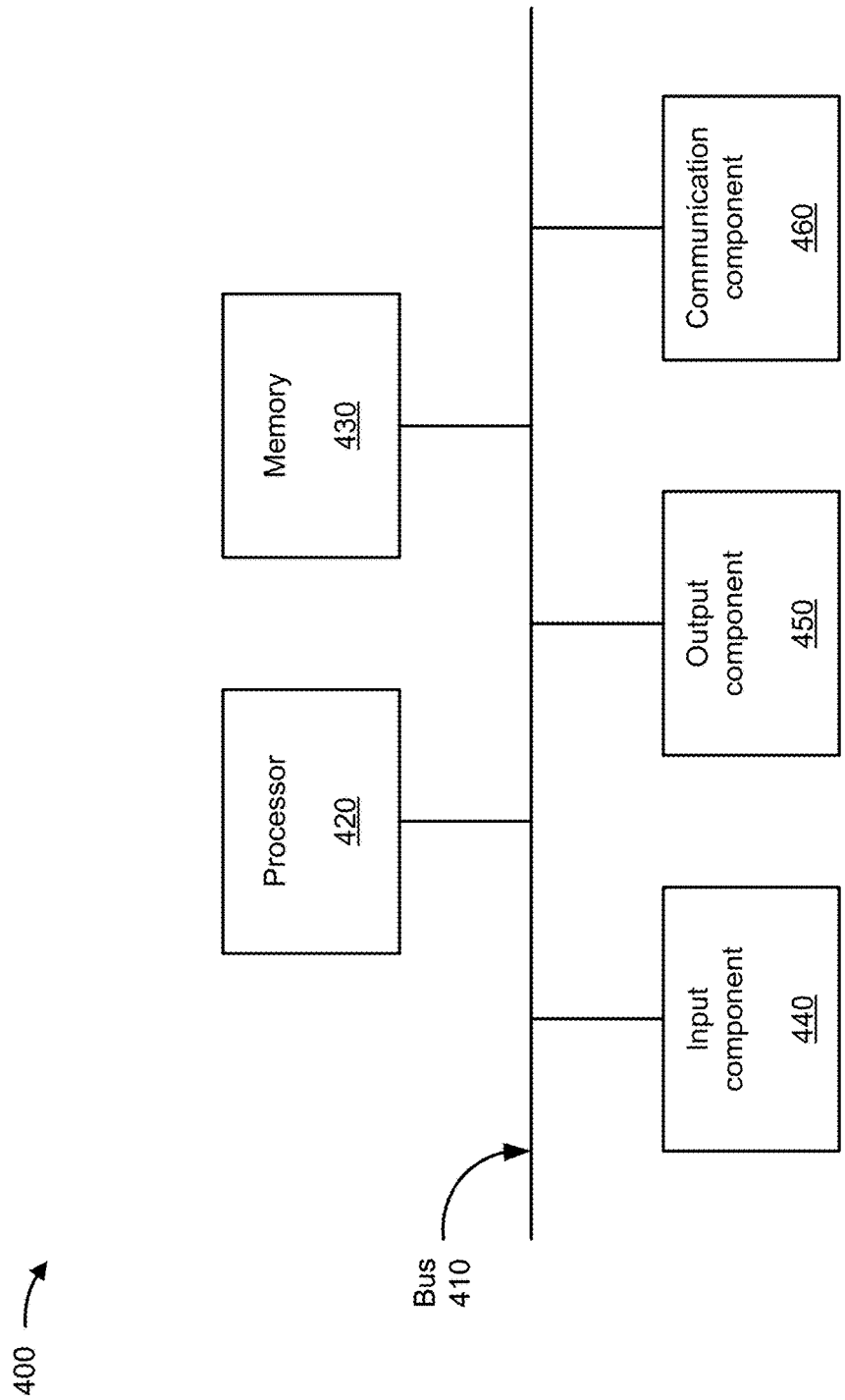
FIG. 4 is a diagram of example components of one or more devices of FIG. 3.

FIG. 4 is a diagram of example components of a device 400, which may correspond to the data structure 105 and/or the context system 110. In some implementations, the data structure 105 and/or the context system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
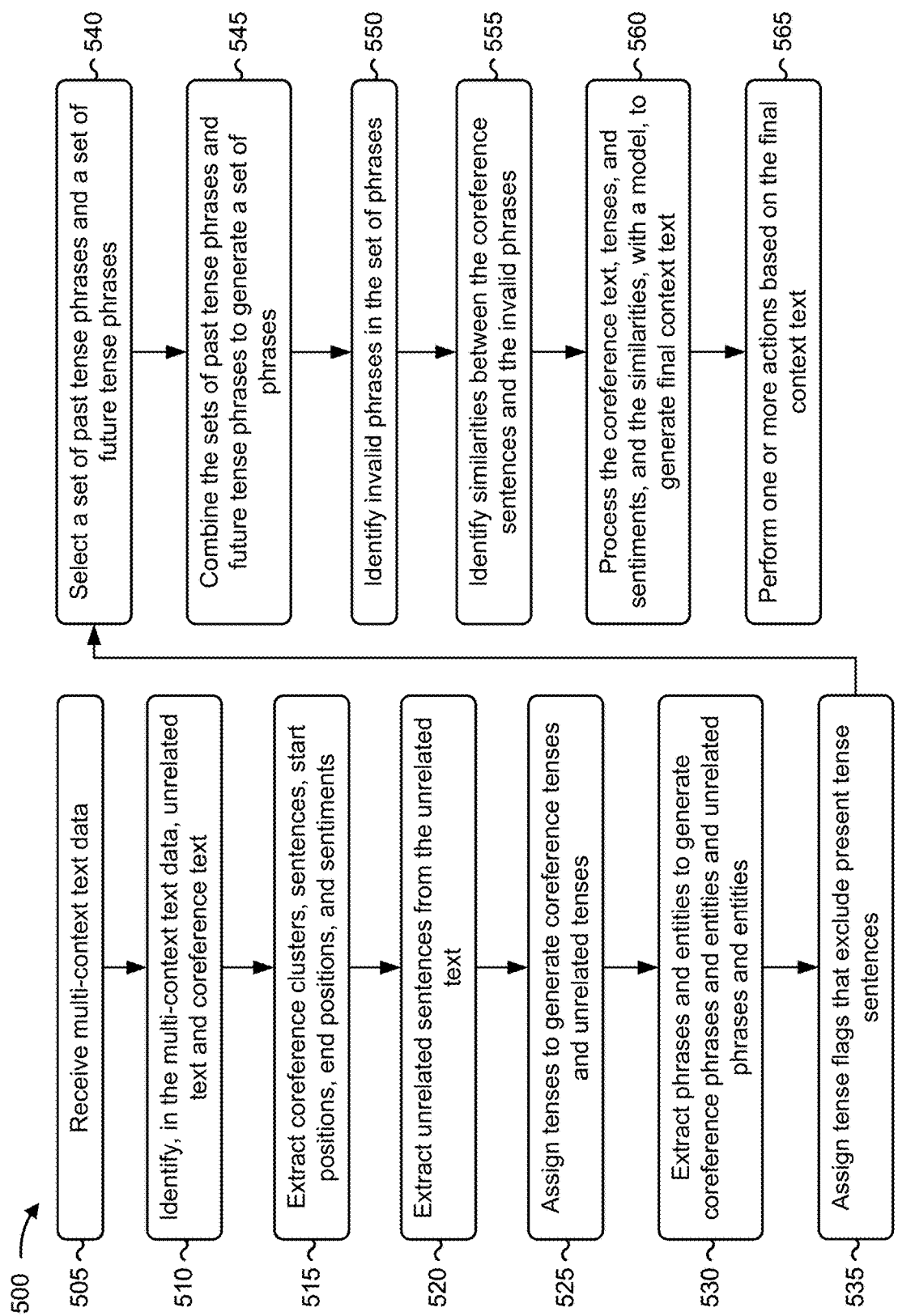
FIG. 5 is a flowchart of an example process for semantic separation of multiple intentions in text data using reinforcement learning.

FIG. 5 is a flowchart of an example process 500 for semantic separation of multiple intentions in text data using reinforcement learning. In some implementations, one or more process blocks of FIG. 5 may be performed by a device (e.g., the context system 110). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving multi-context text data (block 505). For example, the device may receive multi-context text data, as described above.

As further shown in FIG. 5, process 500 may include identifying, in the multi-context text data, unrelated text and coreference text (block 510). For example, the device may identify, in the multi-context text data, unrelated text not referring to a same reference entity and coreference text referring to a same reference entity, as described above.

As further shown in FIG. 5, process 500 may include extracting coreference clusters, sentences, start positions, end positions, and sentiments (block 515). For example, the device may extract, based on the coreference text, coreference clusters, coreference sentences, coreference start positions, coreference end positions, and coreference sentiments, as described above.

As further shown in FIG. 5, process 500 may include extracting unrelated sentences from the unrelated text (block 520). For example, the device may extract unrelated sentences from the unrelated text, as described above.

As further shown in FIG. 5, process 500 may include assigning tenses to generate coreference tenses and unrelated tenses (block 525). For example, the device may assign tenses to the coreference sentences and the unrelated sentences to generate coreference tenses and unrelated tenses, as described above.

As further shown in FIG. 5, process 500 may include extracting phrases and entities to generate coreference phrases and entities and unrelated phrases and entities (block 530). For example, the device may extract phrases and entities from the coreference sentences and unrelated sentences to generate coreference phrases, coreference entities, unrelated phrases, and unrelated entities, as described above.

As further shown in FIG. 5, process 500 may include assigning tense flags that exclude present tense sentences (block 535). For example, the device may assign tense flags that exclude present tense sentences from the coreference sentences and the unrelated sentences, as described above. In some implementations, assigning the tense flags that exclude the present tense sentences from the coreference sentences and the unrelated sentences includes assigning first tense flags to past tense sentences and future tense sentences of the coreference sentences and the unrelated sentences, and assigning second tense flags to the present tense sentences of the coreference sentences and the unrelated sentences.

As further shown in FIG. 5, process 500 may include selecting a set of past tense phrases and a set of future tense phrases (block 540). For example, the device may select a set of past tense phrases and a set of future tense phrases, from the coreference phrases and the unrelated phrases, based on the coreference tenses, the unrelated tenses, and the tense flags, as described above. In some implementations, selecting the set of past tense phrases and the set of future tense phrases, from the coreference phrases and the unrelated phrases, based on the coreference tenses, the unrelated tenses, and the tense flags includes selecting, as the set of past tense phrases, a first threshold quantity of past tense phrases from the coreference phrases and the unrelated phrases, and selecting, as the set of future tense phrases, a second threshold quantity of future tense phrases from the coreference phrases and the unrelated phrases.

As further shown in FIG. 5, process 500 may include combining the sets of past tense phrases and future tense phrases to generate a set of phrases (block 545). For example, the device may combine the set of past tense phrases and the set of future tense phrases to generate a set of phrases, as described above.

As further shown in FIG. 5, process 500 may include identifying invalid phrases in the set of phrases (block 550). For example, the device may identify invalid phrases in the set of phrases based on relevancy to context, as described above. In some implementations, identifying the invalid phrases in the set of phrases based on the relevancy to the context includes determining valid phrases relevant to the context in the set of phrases, determining the invalid phrases not relevant to the context in the set of phrases, assigning a first value to the valid phrases, and assigning a second value to the invalid phrases.

As further shown in FIG. 5, process 500 may include identifying similarities between the coreference sentences and the invalid phrases (block 555). For example, the device may identify similarities between the coreference sentences and the invalid phrases, as described above.

As further shown in FIG. 5, process 500 may include processing the coreference text, tenses, and sentiments, and the similarities, with a model, to generate final context text (block 560). For example, the device may process the coreference text, the coreference tenses, the coreference sentiments, and the similarities, with a reinforcement learning model, to generate final context text, as described above. In some implementations, the reinforcement learning model is a deep learning model.

In some implementations, processing the coreference text, the coreference tenses, the coreference sentiments, and the similarities, with the reinforcement learning model, to generate the final context text includes calculating a first value based on a total quantity of words in the coreference text; calculating a second value based on dividing a total quantity of entities identified in an entity bank divided by the total quantity of words; calculating a third value based on dividing a total quantity of entities identified in an association bank by a total quantity of words in the coreference clusters; and processing the coreference text, the coreference tenses, the coreference sentiments, the similarities, the first value, the second value, and the third value, with the reinforcement learning model, to generate the final context text. In some implementations, the final context text includes text associated with present tense sentiment. In some implementations, the final context text includes text associated with relevant context.

As further shown in FIG. 5, process 500 may include performing one or more actions based on the final context text (block 565). For example, the device may perform one or more actions based on the final context text, as described above.

In some implementations, process 500 includes generating one or more insights based on the final context text. In some implementations, the one or more insights includes one or more of an identification of a topic associated with the multi-context text data, an identification of a sentiment associated with the multi-context text data, or a summary of the multi-context text data.

In some implementations, process 500 includes performing one or more preprocessing techniques on the multi-context text data. In some implementations, the one or more preprocessing techniques includes one or more of a noise removal technique, a tokenization technique, a normalization technique, a stopword removal technique, a stemming technique, a lemmatization technique, or a part-of-speech tagging technique.

In some implementations, process 500 includes generating vectors, and embedding the coreference text in the vectors, wherein processing the coreference text, the coreference tenses, the coreference sentiments, and the similarities, with the reinforcement learning model, to generate the final context text includes processing the vectors, the coreference tenses, the coreference sentiments, and the similarities, with the reinforcement learning model, to generate the final context text.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, multi-context text data;
   identifying, by the device and in the multi-context text data, unrelated text not referring to a same reference entity and coreference text referring to a same reference entity;
   extracting, by the device and based on the coreference text, coreference clusters, coreference sentences, coreference start positions, coreference end positions, and coreference sentiments;
   extracting, by the device, unrelated sentences from the unrelated text;
   assigning, by the device, tenses to the coreference sentences and the unrelated sentences to generate coreference tenses and unrelated tenses;
   extracting, by the device, phrases and entities from the coreference sentences and unrelated sentences to generate coreference phrases, coreference entities, unrelated phrases, and unrelated entities;
   assigning, by the device, tense flags that exclude present tense sentences from the coreference sentences and the unrelated sentences;
   selecting, by the device, a set of past tense phrases and a set of future tense phrases, from the coreference phrases and the unrelated phrases, based on the coreference tenses, the unrelated tenses, and the tense flags;
   combining, by the device, the set of past tense phrases and the set of future tense phrases to generate a set of phrases;

identifying, by the device, invalid phrases in the set of phrases based on relevancy to context;

identifying, by the device, similarities between the coreference sentences and the invalid phrases;

processing, by the device, the coreference text, the coreference tenses, the coreference sentiments, and the similarities, with a reinforcement learning model, to generate final context text; and performing, by the device, one or more actions based on the final context text.

2. The method of claim 1, further comprising:

generating one or more insights based on the final context text.

3. The method of claim 2, wherein the one or more insights includes one or more of:

an identification of a topic associated with the multi-context text data, an identification of a sentiment associated with the multi-context text data, or a summary of the multi-context text data.

4. The method of claim 1, further comprising:

performing one or more preprocessing techniques on the multi-context text data.

5. The method of claim 4, wherein the one or more preprocessing techniques includes one or more of:

a noise removal technique, a tokenization technique, a normalization technique, a stopword removal technique, a stemming technique, a lemmatization technique, or a part-of-speech tagging technique.

6. The method of claim 1, further comprising:

generating vectors; and embedding the coreference text in the vectors, wherein processing the coreference text, the coreference tenses, the coreference sentiments, and the similarities, with the reinforcement learning model, to generate the final context text comprises:

processing the vectors, the coreference tenses, the coreference sentiments, and the similarities, with the reinforcement learning model, to generate the final context text.

7. The method of claim 1, wherein the reinforcement learning model is a deep learning model.

8. A device, comprising:

one or more processors configured to:

receive multi-context text data;

identify, in the multi-context text data, unrelated text not referring to a same reference entity and coreference text referring to a same reference entity;

extract coreference clusters, coreference sentences, coreference start positions, coreference end positions, and coreference sentiments based on the coreference text;

extract unrelated sentences from the unrelated text;

assign tenses to the coreference sentences and the unrelated sentences to generate coreference tenses and unrelated tenses;

extract phrases and entities from the coreference sentences and unrelated sentences to generate coreference phrases, coreference entities, unrelated phrases, and unrelated entities;

assign tense flags that exclude present tense sentences from the coreference sentences and the unrelated sentences;

select a set of past tense phrases and a set of future tense phrases, from the coreference phrases and the unrelated phrases, based on the coreference tenses, the unrelated tenses, and the tense flags;

combine the set of past tense phrases and the set of future tense phrases to generate a set of phrases;

identify invalid phrases in the set of phrases based on relevancy to context;

identify similarities between the coreference sentences and the invalid phrases;

process the coreference text, the coreference tenses, the coreference sentiments, and the similarities, with a reinforcement learning model, to generate final context text; and generate one or more natural language processing insights based on the final context text.

9. The device of claim 8, wherein the one or more processors, to assign the tense flags that exclude the present tense sentences from the coreference sentences and the unrelated sentences, are configured to:

assign first tense flags to past tense sentences and future tense sentences of the coreference sentences and the unrelated sentences; and assign second tense flags to the present tense sentences of the coreference sentences and the unrelated sentences.

10. The device of claim 8, wherein the one or more processors, to select the set of past tense phrases and the set of future tense phrases, from the coreference phrases and the unrelated phrases, based on the coreference tenses, the unrelated tenses, and the tense flags, are configured to:

select, as the set of past tense phrases, a first threshold quantity of past tense phrases from the coreference phrases and the unrelated phrases; and select, as the set of future tense phrases, a second threshold quantity of future tense phrases from the coreference phrases and the unrelated phrases.

11. The device of claim 8, wherein the one or more processors, to identify the invalid phrases in the set of phrases based on the relevancy to the context, are configured to:

determine valid phrases relevant to the context in the set of phrases;

determine the invalid phrases not relevant to the context in the set of phrases;

assign a first value to the valid phrases; and assign a second value to the invalid phrases.

12. The device of claim 8, wherein the one or more processors, to process the coreference text, the coreference tenses, the coreference sentiments, and the similarities, with the reinforcement learning model, to generate the final context text, are configured to:

calculate a first value based on a total quantity of words in the coreference text;

calculate a second value based on dividing a total quantity of entities identified in an entity bank divided by the total quantity of words;

calculate a third value based on dividing a total quantity of entities identified in an association bank by a total quantity of words in the coreference clusters; and process the coreference text, the coreference tenses, the coreference sentiments, the similarities, the first value, the second value, and the third value, with the reinforcement learning model, to generate the final context text.

13. The device of claim 8, wherein the final context text includes text associated with present tense sentiment.

14. The device of claim 8, wherein the final context text includes text associated with relevant context.

15. A non-transitory computer-readable medium storing a set of instructions, the set of instructions comprising:
one or more instructions that, when executed by one or more processors of a device, cause the device to:
receive multi-context text data;
perform one or more preprocessing techniques on the multi-context text data;
identify, in the multi-context text data, unrelated text not referring to a same reference entity and coreference text referring to a same reference entity;
extract coreference clusters, coreference sentences, coreference start positions, coreference end positions, and coreference sentiments based on the coreference text;
extract unrelated sentences from the unrelated text;
assign tenses to the coreference sentences and the unrelated sentences to generate coreference tenses and unrelated tenses;
extract phrases and entities from the coreference sentences and unrelated sentences to generate coreference phrases, coreference entities, unrelated phrases, and unrelated entities;
assign tense flags that exclude present tense sentences from the coreference sentences and the unrelated sentences;
select a set of past tense phrases and a set of future tense phrases, from the coreference phrases and the unrelated phrases, based on the coreference tenses, the unrelated tenses, and the tense flags;
combine the set of past tense phrases and the set of future tense phrases to generate a set of phrases;
identify invalid phrases in the set of phrases based on relevancy to context;
identify similarities between the coreference sentences and the invalid phrases; and
process the coreference text, the coreference tenses, the coreference sentiments, and the similarities, with a reinforcement learning model, to generate final context text.

16. The non-transitory computer-readable medium of claim 15, wherein the one or more instructions further cause the device to:
generate one or more natural language processing insights based on the final context text,
wherein the one or more natural language processing insights includes one or more of:
an identification of a topic associated with the multi-context text data,
an identification of a sentiment associated with the multi-context text data, or
a summary of the multi-context text data.

17. The non-transitory computer-readable medium of claim 15, wherein the one or more instructions further cause the device to:
generate vectors; and
embed the coreference text in the vectors,
wherein the one or more instructions, that cause the device to process the coreference text, the coreference tenses, the coreference sentiments, and the similarities, with the reinforcement learning model, to generate the final context text, cause the device to:
process the vectors, the coreference tenses, the coreference sentiments, and the similarities, with the reinforcement learning model, to generate the final context text.

18. The non-transitory computer-readable medium of claim 15, wherein the one or more instructions, that cause the device to assign tense the flags that exclude the present tense sentences from the coreference sentences and the unrelated sentences, cause the device to:
assign first tense flags to past tense sentences and future tense sentences of the coreference sentences and the unrelated sentences; and
assign second tense flags to the present tense sentences of the coreference sentences and the unrelated sentences.

19. The non-transitory computer-readable medium of claim 15, wherein the one or more instructions, that cause the device to select the set of past tense phrases and the set of future tense phrases, from the coreference phrases and the unrelated phrases, based on the coreference tenses, the unrelated tenses, and the tense flags, cause the device to:
select, as the set of past tense phrases, a first threshold quantity of past tense phrases from the coreference phrases and the unrelated phrases; and
select, as the set of future tense phrases, a second threshold quantity of future tense phrases from the coreference phrases and the unrelated phrases.

20. The non-transitory computer-readable medium of claim 15, wherein the one or more instructions, that cause the device to identify the invalid phrases in the set of phrases based on the relevancy to the context, cause the device to:
determine valid phrases relevant to the context in the set of phrases;
determine the invalid phrases not relevant to the context in the set of phrases;
assign a first value to the valid phrases; and
assign a second value to the invalid phrases.

* * * * *